United States Patent Office 3,441,625
Patented Apr. 29, 1969

3,441,625
PREPARATION OF VINYLIDENE AROMATIC COMPOUNDS BY PYROLYSIS OF DIARYL ALIPHATIC COMPOUNDS
Kim G. Bargeron, Tucson, Ariz., and Fred J. Soderquist, Essexville, Mich., assignors to The Dow Chemical Company, Midland, Mich., a corporation of Delaware
No Drawing. Filed Feb. 26, 1968, Ser. No. 707,940
Int. Cl. C07c 3/00, 3/42, 15/10
U.S. Cl. 260—669                          5 Claims

ABSTRACT OF THE DISCLOSURE

The invention makes styrene and nuclear substituted styrenes by pyrolysis of diaryl aliphatic compounds, e.g. styrene by pyrolysis of 1,3-diphenylbutane.

---

This invention concerns the preparation of vinylidene aromatic compound by the pyrolysis or thermal cracking of diaryl aliphatic compounds. It relates more particularly to the preparation of vinyl aromatic compounds, e.g. styrene and nuclear substituted styrenes.

It is known to prepare 2-phenylnaphthalene by passing the linear dimer, also, called 1,3-diphenylbutene-1, over a dehydrogenation catalyst at temperatures above 500° C., condensing the pyrolyzed vapor mixture and separating 2-phenylnaphthalene therefrom.

It has now been discovered that vinylidene aromatic compounds can readily be prepared by subjecting certain diaryl aliphatic compounds to pyrolysis at temperatures between 550° C. and 900° C., preferably from 600° C. to 750° C., in the presence or absence of a dehydrogenation catalyst and in admixture with, or not in admixture with, an inert diluent, as more specifically hereinafter described.

The diaryl aliphatic starting material can be a compound having the general formula

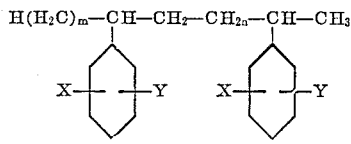

wherein X and Y are each independently selected from the group consisting of hydrogen, chlorine and alkyl radicals having from 1 to 3 carbon atoms, $n$ is an integer from 0 to 2 and $m$ is 0 or 1.

The diaryl aliphatic starting material can be prepared by reacting alpha-methylstyrene or a nuclear substituted alpha-methyl styrene having the general formula

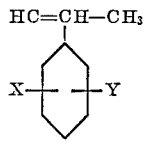

wherein X and Y have the meaning given above, with an aryl compound having the general formula

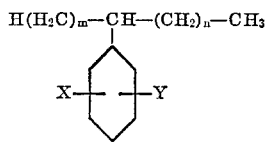

wherein X and Y and $n$ and $m$ have the meaning given above, employing a procedure similar to the potassium-catalyzed reaction of alpha-methylstyrene with alkylbenzenes employed by Shabtai and Pines in Journal Organic Chemistry, vol. 26, pages 4225–4229 (November 1961), to make 1,3-diphenylbutane.

The process of the invention can be carried out by passing the diaryl aliphatic compound, preferably in admixture with superheated steam through a pyrolysis zone or over and through, i.e. into contact with, a dehydrogenation catalyst.

Among dehydrogenation catalysts useful in the practice of the invention are dehydrogenation catalysts such as $A_2O_3$ kaolin, the high zinc catalysts, the 105 catalysts sold by Shell, and the 1707 catalyst described in U.S. Patent 2,395,875. A typical high zinc catalyst comprises by analysis 80% ZnO, 6% CaO, 3% $K_2O$, 1% $Cr_2O_3$ and 10% $Al_2O_3$. The Shell 105 catalyst has a typical composition of 91.5% $Fe_2O_3$, 6% $Cr_2O_3$ and 2.5% $K_2O$. The 1707 catalyst has a typical composition of 72.4% MgO, 18.4% $Fe_2O_3$, 4.6% $K_2O$ and 4.6% $Cr_2O_3$. Other catalysts such as chromia alumina (15% chromia on alumina) may also be used.

The dehydrogenation is carried out at temperatures between 550° and 900° C., preferably 600 to 750° C. At temperatures substantially below 550° C., e.g. 450° C. little, or no reaction occurs. Temperatures above 750° C. may be used if the contact time is decreased so as to limit the degradation of the reactants and/or products.

The invention may be practiced without a diluent, but is advantageously carried out at reduced partial pressure which is more conveniently and economically attained by conducting the reaction in the presence of an inert diluent. Among inert diluents are normal gaseous materials such as nitrogen, helium, argon, flue gas, benzene or water. The preferred diluent is water or steam. An advantage of steam as a diluent is that it tends to regenerate catalysts, when they are used, inhibits polymerization of the styrene product, and is an excellent heat transfer agent. The ratio of diluent to hydrocarbon feed may vary from 0:1 to 50:1, but is advantageously used in a ratio of about 1:7 to 10:1 to be economically attractive.

The liquid hourly space velocity (LHSV) of the diphenyl aliphatic hydrocarbon feed material is not critical and may vary from about 0.2 to 3 or more, and is within the skill of the art. It varies with the temperature, i.e. at higher temperatures the LHSV may be higher, while at lower temperatures it should be lower. In general, the LHSV of the feed hydrocarbon, the steam or water, the space velocity and the temperature are adjusted to obtain the best yield of styrene product with the least amount of by-product or high boiling residue material. This permits the process to be advantageously operated as a continuous recycle type process.

In practice, liquid diphenyl aliphatic hydrocarbon, e.g. 1,3-diphenylbutane, and superheated steam at preferable temperatures of 600–750° C. is fed to a reaction zone such as a bed of ceramic Berl saddles wherein the diphenylbutane is thermally cracked to produce principally styrene and minor amounts of by-product materials. The effluent from the reaction zone is cooled and the liquid ingredients condensed. The non-condensable gases are vented to the atmosphere. The condensed liquid consisting of water and an organic layer is separated from one another. The organic layer is distilled to separate and recover the products. Unreacted 1,3-diphenylbutane is recycled to the reaction.

The following examples illustrate ways in which the principle of the invention has been applied but are not to be construed as limiting its scope.

EXAMPLE 1

Liquid 1,3-diphenylbutane, prepared by reaction of toluene with isopropenylbenzene, and superheated steam at a temperature of 720° C. were passed through a 20.2 cc. tubular reaction packed with a bed of ⅛-inch ceramic Berl saddles. The 1,3-diphenylbutane was fed at an LSHV of 0.995. The steam was fed at a rate of 3.26 parts by weight per part by weight of the 1,3-diphenylbutane. The reaction was carried out at atmospheric pressure. The effluent gases were cooled to condense liquid components. The aqueous and organic layers were separated. The organic layer corresponded to 95 percent by weight of the liquid feed material. Non-condensable gases were vented to the atmosphere. The organic liquid product was collected from two experiments and was analyzed. The product contained compounds expressed as mole percent as follows:

| | Mole percent |
|---|---|
| Benzene | 14.28 |
| Toluene | 7.92 |
| Ethylbenzene | 5.43 |
| Styrene | 47.10 |
| α-Methylstyrene | 5.85 |
| Cumene | 0.80 |
| Indane | 1.20 |
| Indene | 0.15 |
| Diphenyl | 1.43 |
| Phenylnaphthalene | 2.56 |
| 1,3-diphenylbutane | 10.68 |
| Residue | 2.60 |
| | 100.00 |

EXAMPLE 2

Liquid 1,3-diphenylbutane and superheated steam at a temperature of 720° C. were fed to a 20.2 cc. tubular reactor packed with ⅛-inch ceramic Berl saddles. The 1,3-diphenylbutane was fed at a LSHV of 2.04. The steam was fed at a ratio of 3.68 parts per part by weight of the 1,3-diphenylbutane. The reaction was carried out at atmospheric pressure. The effluent gases were cooled to condense liquid components. The aqueous and organic layers were separated. The organic layer was equal to 95 percent of the weight of the liquid organic feed material. The organic layer was analyzed. It contained compounds as follows:

| | Mole percent |
|---|---|
| Benzene | 5.16 |
| Toluene | 4.10 |
| Ethylbenzene | 3.30 |
| Styrene | 32.29 |
| α-Methylstyrene | 6.43 |
| Cumene | 0.69 |
| Indane | 0.72 |
| Phenylnaphthalene | 3.45 |
| 1,3-diphenylbutane | 41.20 |
| Residue | 2.66 |
| | 100.00 |

EXAMPLE 3

Liquid 1,3-diphenylbutane and superheated steam at a temperature of 625° C. were fed to a 64.4 cc. tubular reactor packed with granular Shell #105 catalyst. The 1,3-diphenylbutane was fed at a LSHV of 0.312. The steam was fed at a ratio of 3.06 parts per part by weight of the 1,3-diphenylbutane. The effluent gases were cooled.

The organic liquid product was separated and analyzed. It contained compounds as follows:

| | Percent |
|---|---|
| Benzene | 4.31 |
| Toluene | 13.34 |
| Ethylbenzene | 10.87 |
| Styrene | 35.77 |
| α-Methylstyrene | 9.03 |
| Phenylnaphthalene | 1.87 |
| 1,3-diphenylbutane | 24.81 |
| | 100.00 |

In a manner similar to that described in the foregoing examples, the compounds 1,3-ditolylbutane, 1,3-(dichlorophenyl)butane, 1,3-(diethylphenyl)butane and 2,4-diphenylpentane can be converted to the corresponding vinyl aromatic compounds, i.e. vinyltoluene, chlorostyrene, ethylstyrene and styrene.

We claim:
1. A process for making vinylidene aromatic compounds which comprises subjecting a diaryl aliphatic compound having the general formula

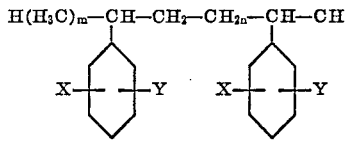

wherein X and Y are each independently selected from the group consisting of hydrogen, chlorine and alkyl radicals having from 1 to 3 carbon atoms, $n$ is an integer from 0 to 2 and $m$ is 0 to 1, to pyrolysis at a temperature of at least 550° C. at an LHSV of at least 0.2 to thermally crack said diaryl compound to form a major proportion of a corresponding styrene and a minor proportion of a correspnding alpha-methyl styrene, cooling the pyrolysis vapor mixture and condensing liquid product and separating the vinylidene aromatic compounds therefrom.

2. A process as claimed in claim 1 wherein the pyrolysis is carried out in admixture with superheated steam.

3. A process as claimed in claim 1 wherein the diaryl aromatic compound is 1,3-diphenylbutane.

4. A process as claimed in claim 3 wherein the process is carried out in admixture with superheated steam.

5. A process as claimed in claim 1, wherein the pyrolysis is carried out in contact with a catalyst.

References Cited

UNITED STATES PATENTS

| 2,442,171 | 10/1947 | Saunders | 260—668 |
| 2,836,632 | 5/1958 | Fetterly | 260—668 |
| 3,062,903 | 11/1962 | Odioso et al. | 260—668 |

DELBERT E. GANTZ, *Primary Examiner.*

C. R. DAVIS, *Assistant Examiner.*

U.S. Cl. X.R.

260—650, 668